United States Patent [19]
Baker et al.

[11] 4,189,729
[45] Feb. 19, 1980

[54] MOS ADDRESSING CIRCUITS FOR DISPLAY/MEMORY PANELS

[75] Inventors: Theodore C. Baker, Wayne; William E. Johnson, Toledo, both of Ohio

[73] Assignee: Owens-Illinois, Inc., Toledo, Ohio

[21] Appl. No.: 896,523

[22] Filed: Apr. 14, 1978

[51] Int. Cl.[2] .............................................. G06F 3/14

[52] U.S. Cl. .................................... 340/777; 340/718; 340/771; 340/779; 340/805

[58] Field of Search ............... 340/758, 771, 776, 777, 340/779, 789, 802, 805, 811, 718, 719

[56] References Cited

U.S. PATENT DOCUMENTS

| | | | |
|---|---|---|---|
| 3,840,779 | 10/1974 | Schermerhorn | 340/805 |
| 3,953,762 | 4/1976 | Iwakawa et al. | 340/811 |
| 4,027,196 | 5/1977 | Criscimagna et al. | 340/771 |
| 4,070,600 | 1/1978 | Butler et al. | 340/771 |
| 4,072,937 | 2/1978 | Chu | 340/777 |

*Primary Examiner*—Marshall M. Curtis

*Attorney, Agent, or Firm*—David R. Birchall; Myron E. Click; David H. Wilson

[57] ABSTRACT

A driving and addressing circuit for applying sustaining, writing and erasing voltages to the cells of a multicelled gas discharge display/memory panel. The voltage generating circuitry is isolated from each panel electrode by a pair of oppositely poled diodes individual to that electrode. The diodes provide low impedance paths for the sustainer current and isolate the electrodes from each other. The writing and erasing voltages are coupled to the electrodes through a plurality of complementary MOSFETs, one per electrode, which eliminate all but one of the diode switch circuits per electrode array of the prior art circuitry. The P-channel and N-channel MOSFETs can be formed on separate integrated circuit chips with one of the pair of the diodes while the other diodes are formed on common anode and common cathode integrated circuit chips. In addition, a portion of the addressing circuitry can be formed on the MOSFET chips. Such a circuit configuration substantially reduces the power requirements and circuit complexity.

8 Claims, 10 Drawing Figures

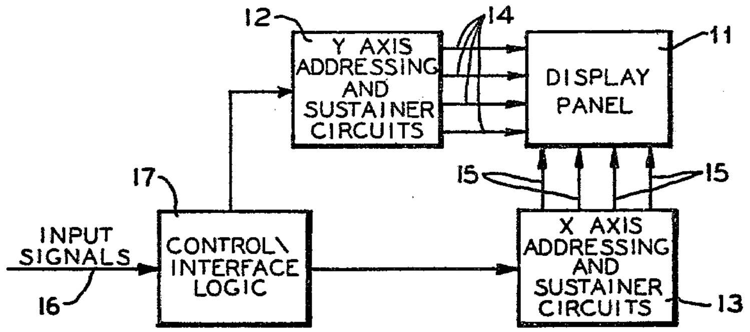

FIG.1

| CIRCUIT | BEFORE t0 | t0-t1 | t1-t2 | t2-t3 | t3-t4 | WRITE t4-t5 | t5-t6 | ERASE t6-t7 |
|---|---|---|---|---|---|---|---|---|
| 31 | ON | ON | OFF | OFF | ON | ON | OFF | OFF |
| 32 | OFF | OFF | OFF | ON | OFF | OFF | OFF | ON |
| 33 | OFF | OFF | ON | OFF | OFF | OFF | ON | OFF |
| 48 | OFF | ON | OFF | OFF | OFF | ON / OFF / ON | OFF | OFF |
| 73 | OFF | OFF | OFF | OFF | OFF | OFF / ON / OFF | OFF | OFF / ON / OFF |
| 54 | OFF | OFF | ON | ON | OFF | OFF | ON | ON |
| 56 | OFF | ON | OFF | OFF | OFF | ON | OFF | OFF |
| 58 | ON | OFF | OFF | OFF | ON | OFF | OFF | OFF |
| 64 | OFF | ON | OFF | OFF | OFF | ON / OFF / ON | OFF | OFF |
| 77 | OFF | OFF | OFF | OFF | OFF | OFF / ON / OFF | OFF | OFF / ON / OFF |
| 81 | OFF | OFF | OFF | OFF | OFF | OFF | OFF | ON |

FIG.4

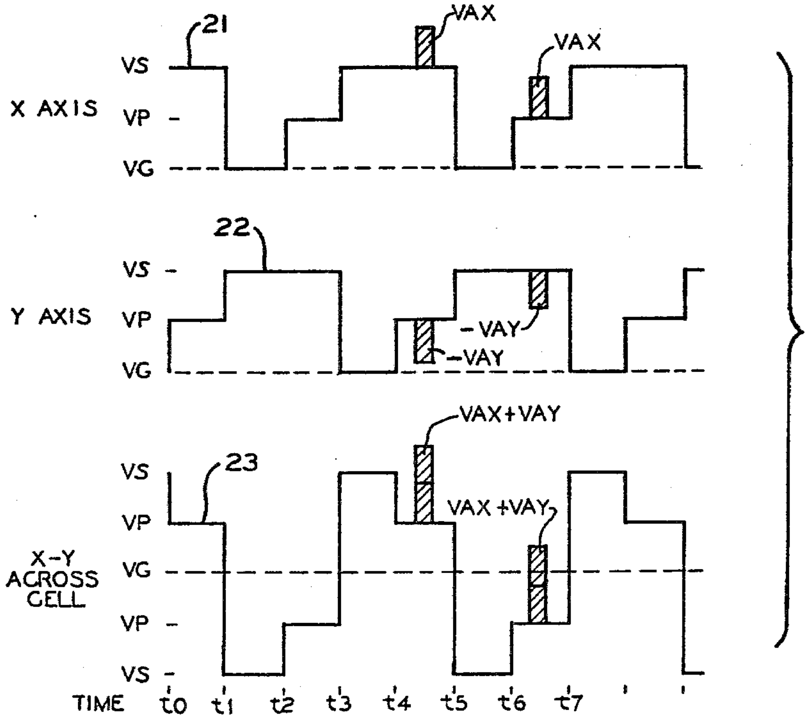

FIG.3

MOS ADDRESSING CIRCUITS FOR DISPLAY/MEMORY PANELS

BACKGROUND OF THE INVENTION

1. Field of the Invention

This invention relates to circuits for controlling gas discharge devices, especially multiple gas discharge display/memory devices which have an electrical memory and which are capable of producing a visual display or representation of data.

2. Description of the Prior Art

Heretofore, multiple gas discharge display and/or memory panels have been proposed in the form of a pair of dielectric charge storage members which are backed by electrodes, the electrodes being so formed and oriented with respect to an ionizable gaseous medium as to define a plurality of discrete gas discharge units or cells. The cells have been defined by a surrounding or confining physical structure such as the walls of apertures in a perforated glass plate sandwiched between glass surfaces and they have been defined in an open space between glass or other dielectric backed with conductive electrode surfaces by appropriate choices of the gaseous medium, its pressure and the electrode geometry. In either structure, charges (electrons and ions) produced upon ionization of the gas volume of a selected discharge cell, when proper alternating operating voltages are applied between the opposed electrodes, are collected upon the surface of the dielectric at specifically defined locations. These charges constitute an electrical field opposing the electrical field which created them so as to reduce the voltage and terminate the discharge for the remainder of the cycle portion during which the discharge producing polarity remains applied. These collected charges aid an applied voltage of the polarity opposite that which created them in the initiation of a discharge by imposing a total voltage across the gas sufficient to again initiate a discharge and a collection of charges. This repetitive and alternating charge collection and ionization discharge constitutes an electrical memory.

An example of a panel structure containing non-physically isolated or open discharge cells is disclosed in U.S. Pat. No. 3,499,167 issued to Theodore C. Baker, et al. Physically isolated cells have been disclosed in the article by D. L. Bitzer and H. G. Slottow entitled "The Plasma Display Panel—A Digitally Addressable Display With Inherent Memory", Proceeding of the Fall Joint Computer Conference, I E E E, San Francisco, Calif., November 1966, pp. 541-547 and in U.S. Pat. No. 3,559,190.

One construction of a memory/display panel includes a continuous volume of ionizable gas confined between a pair of dielectric surfaces backed by conductor arrays, typically in parallel lines with the arrays of lines orthogonally related, to define in the region of the projected intersections as viewed along the common perpendicular to each array, a plurality of opposed pairs of charge storage areas on the surfaces of the dielectric bounding or confining the gas. Many variations of the individual conductor form, the array form, their relationship to each other and to the dielectric and gas are available, hence the orthogonally related, parallel line arrays which are discussed herein are merely illustrative.

In prior art, a wide variety of gases and gas mixtures have been utilized as the ionizable gaseous medium, it being desirable that the gas provide a copious supply of charges during discharge, be inert to the materials with which it comes in contact and, where a visual display is desired, be one which produces a visible light or radiation which stimulates a phosphor. Preferred embodiments of the display panel have utilized at least one rare gas, more preferably at least two, selected from helium, neon, argon, krypton or xenon.

In the operation of the display/memory device an alternating voltage is applied, typically, by applying a first periodic voltage wave form to one array and applying a cooperating second wave form, frequently identical to and shifted on the time axis with respect to the first wave form, to the opposed array to impose a voltage across the cells formed by the opposed arrays of electrodes which is the algebraic sum of the first and second wave forms. The cells have a voltage at which a discharge is initiated. That voltage can be derived from an externally applied voltage or a combination of wall charge potential and an externally applied voltage. Ordinarily, the entire cell array is excited by an alternating voltage which, by itself, is of insufficient magnitude to ignite gas discharges in any of the elements. When the walls are appropriately charged, as by means of a previous discharge, the voltage applied across the element will be augmented, and a new discharge will be ignited. Electrons and ions again flow to the dielectric walls extinguishing the discharge. However, on the following half cycle, their resultant wall charges again augment the applied external voltage and cause a discharge in the opposite direction. The sequence of electrical discharges is sustained by an alternating voltage signal that, by itself, could not initiate that sequence.

In addition to the sustaining voltage, there are manipulating voltages or addressing voltages imposed on the opposed electrodes of a selected cell or cells to alter the state of those cells selectively. One such voltage, termed a "writing voltage", transfers a cell or discharge site from the quiescent to the discharging state by virtue of a total applied voltage across the cell sufficient to make it probable that on subsequent sustaining voltage half cycles the cell will be in the "on state". A cell in the "on state" can be manipulated by an addressing voltage, termed an "erase voltage", which transfers it to the "off state" by imposing sufficient voltage to draw off the surface or wall charges on the cell walls and cause them to discharge without being collected on the opposite cell walls in an amount such that succeeding sustainer voltage transitions are not augmented sufficiently by wall charges to ignite discharges.

A common method of producing writing voltages is to superimpose voltage pulses on a sustainer wave form in an aiding direction and cumulatively with the sustainer voltage, the combination having a potential of enough magnitude to fire an "off state" cell into the "on state". Erase voltages are produced by superimposing voltage pulses on a sustainer wave form in opposition to the sustainer voltage to develop a potential sufficient to cause a discharge in an "on state" cell and draw the charges from the dielectric surfaces such that the cell will be in the "off state". The wall voltage of a discharged cell is termed an "off state wall voltage" and frequently is midway between the extreme magnitude limits of the sustainer voltage.

Circuitry for sustaining voltages, and where employed, their pedestal, and for the manipulating voltages for writing and erasing individual cells can be quite extensive. Transformer coupling of manipulating signals to the electrodes of multiple gas discharge display/memory devices has been disclosed in William E. Johnson et al, U.S. Pat. No. 3,618,071 for "Interfacing Circuitry and Method for Multiple-Discharge Gaseous Display and/or Memory Panels" which issued Nov. 2, 1971. The coupling of individual electrodes in large arrays involving substantial numbers of electrodes is cumbersome and expensive. Accordingly, solid-state pulser circuits capable of feeding through the sustaining voltage were proposed as exemplified in William E. Johnson, U.S. Pat. No. 3,611,296 of Oct. 5, 1971 for "Driving Circuitry For Gas Discharge Panel". Multiplexing of the signals to the electrodes in an array has been utilized employing combinations of diode and resistor pulsers to manipulate cell potentials as shown in U.S. Pat. No. 3,684,918 issued Aug. 15, 1972 to Larry J. Schmersal for "Gas Discharge Display/Memory Panels and Selection and Addressing Circuits Therefor".

SUMMARY OF THE INVENTION

A typical multiplexed addressing circuit includes a resistor-diode adder circuit connected to each electrode. The diode is poled so that when the same polarity voltage is applied to both the resistor and the diode, or when the return path through the diode is opened, a "write" or "erase" voltage pulse can be generated on the associated electrode. A second diode is connected to each electrode to provide a low impedance return path for the current. Therefore, during addressing the two diodes isolate the electrode from the other electrodes, but during sustaining they provide low impedance paths for current flow in both directions. A diode switch matrix for each electrode array functions as a multiplexing circuit for addressing the cells.

In the present invention, the diode isolation circuit is retained, but the resistors are replaced by MOSFETs, N-channel devices for one electrode array and P-channel devices for the other electrode array. Each diode switch matrix is reduced to a single diode switch which functions to complete a sustainer current path during the normal sustaining operation and break that path for addressing when required. The MOSFETs are formed on integrated circuit chips with one of the pair of isolation diodes while the other isolation diodes are formed on common anode and common cathode integrated circuit chips to reduce the circuit power requirements and complexity.

Typically, thirty-two devices are formed on a single integrated circuit chip. Therefore, one N-channel MOSFET chip, one P-channel MOSFET chip, one common anode diode chip and one common cathode diode chip can be utilized to address a thirty-two by thirty-two electrode display panel. The chips can be mounted on the edge of the display panel to further reduce the electrical interconnections.

It is an object of the present invention to provide a multicell gas discharge display/memory panel driving and addressing circuit which can be easily formed in integrated circuits to reduce the cost of the panel operating system and the power requirements therefor.

It is another object of the present invention to simplify the gas discharge panel driving and addressing circuit by eliminating the diode switch matrix and control circuits therefor.

The subject matter of this application is related to subject matter disclosed in the following U.S. patent applications: Ser. No. 702,114 entitled "Driving And Addressing Circuitry For Gas Discharge Display/Memory Panels" filed July 2, 1976 in the names of J. D. Schermerhorn and H. G. Slottow which discloses an isolation diode and individual electrode pulser circuit; Ser. No. 791,237 entitled "Method And Apparatus For Open Drain Addressing Of A Gas Discharge Display/Memory Panel" filed Apr. 27, 1977 in the name of John W. V. Miller which discloses an isolation diode and MOSFET switching circuit; and Ser. No. 825,291 entitled "Ground-Reference Power Supply For Gas Discharge Display/Memory Panel Driving And Addressing Circuitry" in the name of John W. V. Miller filed Aug. 17, 1977 which discloses a ground potential referenced addressing power supply for use with an isolation diode and MOSFET switching circuit. These patent applications are assigned to the assignee of this application.

BRIEF DESCRIPTION OF THE DRAWINGS

FIG. 1 is a block diagram of a multicelled gas discharge display/memory device and operating system therefor;

FIG. 3 is a wave form diagram of the sustainer wave form with "write" and "erase" pulses generated by the circuit of FIG. 2;

FIG. 4 is a table of switch states for the circuit of FIG. 2;

DESCRIPTION OF THE PREFERRED EMBODIMENT

Figure 2:
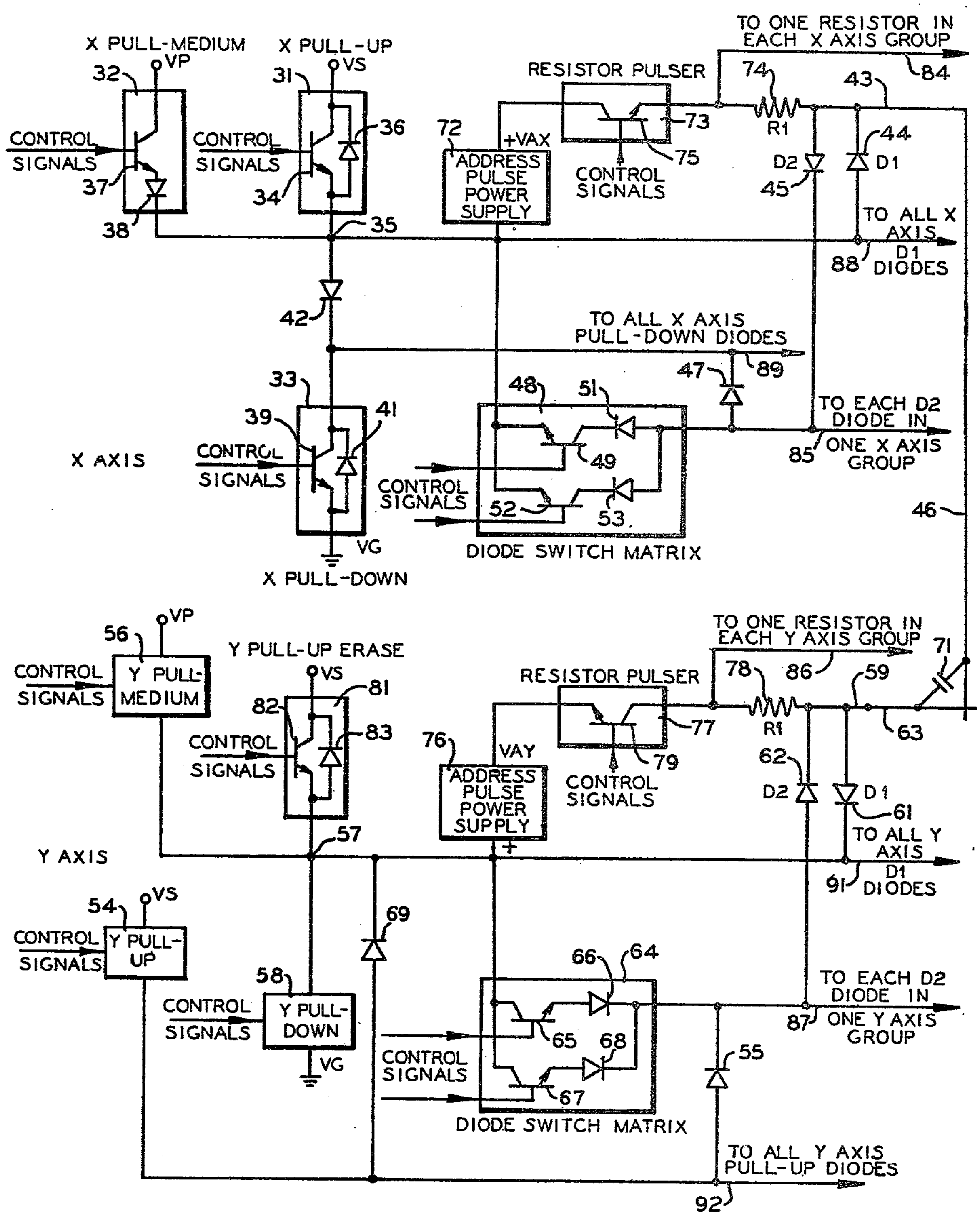
FIG.2 (PRIOR ART)
FIG. 2 is a partial schematic, partial block diagram of a portion of a prior art addressing and sustaining circuit.

There is shown in FIG. 1 a block diagram of a multicelled gas discharge display/memory device and operating system therefor to which the present invention is applicable. The device is represented as a display panel 11 which may be of the type disclosed in U.S. Pat. No. 3,499,167 issued to Theodore C. Baker, et al. The panel 11 includes a pair of opposed electrode arrays (not shown) with proximate electrode portions of at least one electrode in each array defining the cells. Sustainer and addressing voltage wave forms are applied to the panel 11 to maintain and manipulate the discharge states of individual cells. The addressing and sustainer wave forms are generated by a pair of addressing and sustainer circuits, a Y axis circuit 12 and an X axis circuit 13, which are connected to the Y axis and X axis electrode arrays respectively. A plurality of leads 14 are representative of the interconnections between the Y axis circuit 12 and the Y axis electrodes of the panel 11 and a plurality of leads 15 are representative of similar interconnections on the X axis. The information to be displayed by the panel 11 is externally generated and applied as input signals on one or more input lines 16 to a control/interface logic circuit 17. The circuit 17 buffers and decodes the input signals to generate control signals to the circuits 12 and 13.

FIG. 2 is a partial schematic, partial block diagram of a portion of circuits similar to each of the circuits 12 and 13 in a prior art configuration for generating addressing and sustainer wave forms such as the wave forms shown in FIG. 3. During the normal sustainer operation, X and Y sustainer circuits impress sustainer wave forms on the X and Y electrode arrays respectively. As shown in FIG. 3, an X axis sustainer wave form 21 and a Y axis sustainer wave form 22 are combined to generate a composite sustainer wave form 23 which is applied to all of the cells in the panel 11. The X axis sustainer circuit includes three sustainer voltage circuits, a X pull-up circuit 31, an X pull-medium circuit 32 and an X pull-down circuit 33 for generating the X sustainer wave form 21. The X pull-up circuit 31 is connected to a sustainer voltage power supply (not shown) to receive a sustainer voltage VS. The circuit 31 is represented as an NPN transistor 34 having a collector connected to the VS power supply, a base connected to receive control signals from the control/interface logic circuit 17 of FIG. 1 and an emitter connected to a common junction 35 for the circuits 31, 32 and 33. A diode 36 has a cathode connected to the collector and an anode connected to the emitter of the transistor 34 to function as a diode clamp.

The X pull-medium circuit 32 is connected to a sustainer power supply (not shown) to receive a pedestal voltage VP of a magnitude intermediate the voltage VS and the voltage applied by the X pull-down circuit 33. The circuit 32 is represented by an NPN transistor 37 having a collector connected to the VP power supply, a base connected to receive control signals from the circuit 17 of FIG. 1 and an emitter connected to an anode of a diode 38 having a cathode connected to the common junction 35 for the circuits 31, 32 and 33. The X pull-down circuit 33 is connected to a sustainer power supply (not shown) to receive a ground voltage VG which is the neutral potential for the sustainer wave form. The circuit 33 is represented by an NPN transistor 39 having a collector connected to the common junction 35, a base connected to receive control signals from the circuit 17 of FIG. 1 and an emitter connected to the voltage VG. A diode 41 has a cathode connected to the collector of the transistor 39 and an anode connected to the emitter to function as a diode clamp. A diode 42 is connected between the circuit 33 and the common junction 35 with an anode connected to the common junction and a cathode connected to the collector of the transistor 39.

In FIG. 2, each electrode is connected to its own pair of isolation diodes designated D1 and D2. These diodes are oppositely poled to provide low impedance paths for the sustainer current flow and to isolate each electrode from the other electrodes in the panel during addressing.

The circuits 31, 32 and 33 are connected to an X axis lead 43 through a D1 diode 44 and a D2 diode 45. The D1 diode 44 has an anode connected to the common junction 35 and a cathode connected to the lead 43. The lead 43 can be a conductor on a flexible ribbon cable having one end connected to the addressing and sustainer circuits and the other end connected to an exposed end of an electrode 46 of the panel, where the circuits are mounted remote from the panel, or can be the exposed end of the electrode where the circuits are mounted on the panel substrate surrounding the actual viewing area. The circuit 33 is connected to a cathode of a diode 47 having an anode connected to a cathode of the D2 diode 45 which has an anode connected to the lead 43. The sustainer circuits are individually enabled by the control signals to generate the X axis wave form 21 shown in FIG. 3 on the electrode 46 through the D1 diode 44 and the D2 diode 45. The sustainer circuits are also connected to the other X axis electrodes as will be discussed.

The D2 diode 45 has its cathode connected to one lead of a diode switch matrix 48. Another lead of the matrix 48 is connected to the common junction 35. A portion of the matrix 48 is represented as a pair of transistor switches connected in parallel. A first NPN transistor 49 has a collector connected to a cathode of a diode 51, a base connected to receive control signals from the circuit 17 of FIG. 1 and an emitter connected to the common junction 35. A second NPN transistor 52 has a collector connected to receive a cathode of a diode 53, a gate connected to receive control signals from the circuit 17 of FIG. 1 and an emitter connected to the common junction 35. The diodes 51 and 53 each have an anode connected to the anode of the diode 47. The diode switch matrix 48 and a similar matrix for the Y axis also serve as multiplexing circuits for addressing the cells as will be subsequently discussed.

The Y axis also has sustainer circuits similar to the circuits 31, 32 and 33, such as a Y pull-up circuit 54 connected between the VS power supply (not shown) and a diode 55, a Y pull-medium circuit 56 connected between the VP power supply (not shown) and a common junction 57 and a Y pull-down circuit 58 connected between the VG power supply (not shown) and the common junction 57. The circuits 54, 56 and 58 are connected to a Y axis lead 59, similar to the X axis lead 43, through a D1 diode 61 and a D2 diode 62. The D1 diode 61 has a cathode connected to the common junction 57 and an anode connected to the lead 59. The circuit 54 is connected to an anode of the diode 55 which has a cathode connected to an anode of the D2 diode 62 which has a cathode connected to the lead 59. The lead 59 is connected to an electrode 63 wherein the circuits are alternately enabled by control signals from the circuit 17 of FIG. 1 to generate the Y axis wave form 22 shown in FIG. 3 through the D1 diode 61 and the D2 diode 62. The sustainer circuits are also connected to all of the other Y axis electrodes, as will be discussed, to apply the Y axis sustainer wave form 22 to the Y axis electrode array.

The D2 diode 62 has its anode connected to one lead of a diode switch matrix 64. Another lead of the matrix 64 is connected to the common junction 57. A portion of the matrix is represented as a pair of transistor switches connected in parallel. A first NPN transistor 65 has a collector connected to the junction 57, a base connected to receive control signals from the circuit 17 of FIG. 1 and an emitter connected to an anode of a diode 66. A second NPN transistor 67 has a collector connected to the junction 57, a base connected to receive the control signals from the circuit 17 and an emitter connected to an anode of a diode 68. The diodes 66 and 68 each have a cathode connected to the anode of the D2 diode 62. The circuit 54 is also connected to the junction 57 through a diode 69 having an anode connected to the circuit 54 and a cathode connected to the junction 57.

The electrodes 46 and 63 have proximate portions which define a typical gas discharge cell 71. Assuming the initial conditions shown before time t0 in FIG. 3, the X pull-up circuit 31 is turned on to apply the VS voltage to the electrode 46 through the D1 diode 44 and the Y pull-down circuit 58 is turned on to apply the VG voltage to the electrode 63 through the D1 diode 61. At time t0, the circuit 58 is turned off and the Y pull-medium circuit 56 and the matrix 64 are turned on to connect the VP voltage to the electrode 63 through the D2 diode 62. Since the electrode 63 was at the VG voltage, the charge across the cell 71 must decrease which it cannot do instantaneously. The voltage on the electrode 46 is driven to VS+VP to reverse bias the diode 44. Therefore, the matrix 48 is turned on to provide a path for the displacement current which flows from the electrode 46, through the diode 45, through the matrix 48 and through the diode 36 to the VS power supply to partially discharge the cell to the new applied voltage shown as the portion of the sustainer waveform 23 between t0 and t1 in FIG. 3.

Between the times t1 and t2, the X pull-down circuit 33 is turned on to connect the VG voltage to the electrode 46 through the D2 diode 45 and the diode 47. The D1 diode 44 is biased at VG by the circuit 33 through the diode 42. The Y pull-up circuit 54 is turned on to connect the VS voltage to the electrode 63 through the D2 diode 62 and the diode 55. Between the times t2 and t3, displacement current flows through the diode 38 as the circuit 32 is turned on to connect the VP voltage to the electrode 46 through the D1 diode 44 and the circuit 54 is turned on to connect the VS voltage to the electrode 63. Between the times t3 and t4, the X pull-up circuit 31 is turned on to connect the VS voltage to the electrode 46 through the D1 diode 44 and the Y pull-down circuit 58 is turned on to connect the VG voltage to the electrode 63 through the D1 diode 61. Between the times t0 and t4 a full cycle of the sustainer wave form 23 has been generated and the sequence of control signals is repeated to generate a train of such cycles. The status of each of the sustainer and matrix circuits is shown in the table of FIG. 4 wherein "on" designates that a transistor switch is closed and "off" designates that the switch is open.

It has been shown that the D1 and D2 diodes connected to each electrode provide low impedance paths for the sustainer current in both directions of flow. However, the D2 diodes also function as electrode selection elements during the addressing of the cells. An X axis address pulse power supply 72 has one lead connected to the common junction 35 and the other lead connected to the lead 43 through a resistor pulser 73 and an R1 resistor 74 connected in series. The pulser 73 is represented by an NPN transistor 75 having a collector connected to the power supply 72, a base connected to receive control signals from the circuit 17 of FIG. 1 and an emitter connected to the R1 resistor 74. When the pulser 73 is turned on, the power supply 72 applies an address pulse voltage VAX to the electrode 46 through the R1 resistor 74. The polarity of the voltage VAX is such that VAX is added to the sustainer voltage which is generated at the junction 35.

A Y axis address pulse power supply 76 has one lead connected to the common junction 57 and the other lead connected to the lead 59 through a resistor pulser 77 and an R1 resistor 78 connected in series. The pulser 77 is represented by an NPN transistor 79 having a collector connected to the resistor 78, a base connected to receive control signals from the circuit 17 of FIG. 1 and an emitter connected to the power supply 76. When the pulser 77 is turned on, the power supply applies an address pulse voltage VAY to the electrode 63 through the R1 resistor 78. The polarity of the voltage VAY is such that VAY is subtracted from the sustainer voltage which is generated at the junction 57. The R1 resistor 74 and D2 diode 45 and the R1 resistor 78 and the D2 diode 62 form a pair of resistor-diode adder circuits.

If the pulsers 73 and 77 are turned on during the time period t4–t5, the voltage VAX will be added to the sustainer voltage VS and the voltage VAY will be subtracted from the sustainer voltage VP as shown in FIG. 3. The magnitudes of the voltages VAX and VAY are such that neither one alone in the time period t4–t5 will generate a discharge in the cell 71, but together they are sufficient to write the cell. However, as shown in the table of FIG. 4, the diode switch matrices 48 and 64 are turned off during the time the pulsers 73 and 77 are turned on to block the return paths through the D2 diodes 45 and 62 so that the write addressing voltages are applied to the cell 71. If the pulsers 73 and 77 are turned on during the time period t6–t7, the voltage VAX will be added to the sustainer voltage VP and the voltage VAY will be subtracted from the sustainer voltage VS as shown in FIG. 3 to erase the cell 69. The diode switch matrices 48 and 64 are turned off during the time the pulsers 73 and 77 are turned on to block the return paths through the D2 diodes 47 and 63. A Y pull-up erase circuit 81 is provided to supply the VS voltage during the erase period. An NPN transistor 82 has a collector connected to the VS power supply, a base connected to receive control signals from circuit 17 of FIG. 1 and an emitter connected to the junction 57. A diode 83 has an anode connected to the emitter and cathode connected to the collector of the transistor 82 to function as a clamp. The circuit 81 is utilized during the erase period to generate a VS reference for the VAY voltage power supply 76 since the Y pull-up circuit 54 is isolated from the power supply 76 by several diodes (not shown).

Where the X and Y electrode arrays each include a large number of electrodes, some of the prior art circuits have utilized a multiplexing approach to addressing the cells. For example, both electrode arrays can be divided into groups of electrodes, each group containing the same number of electrodes. In FIG. 2 the resistor pulser 73 is connected to one electrode in each group through an R1 resistor for each electrode as illustrated by the R1 resistor 74 for the electrode 46. A line 84 is provided for connecting the pulser 73 to the other R1 resistors (not shown). Another portion of the multiplexing circuit is the D2 diode 45 and the matrix 48. The matrix 48 is connected to a D2 diode for each of the electrodes in one X axis group by a line 85. Each of the other groups is also provided with similar diode switches for multiplexing. When the pulser 73 is turned on, the matrix 48 is turned off and all other switches remain turned on such that VAX is dropped across each of the R1 resistors connected to the pulser 73 except the R1 resistor 74. Therefore, only the electrode 46 receives the VAX voltage. The Y axis electrodes are similarly connected in groups. The pulser 77 is connected to an R1 resistor in each group by a line 86. The matrix 64 is connected to each D2 diode in one group by a line 87. The matrix 64 is turned off when the pulser 77 is turned on so that only the electrode 63 receives the VAY voltage.

The sustainer wave forms are also applied to the other electrodes. The circuits 31 and 32 are connected to all of the X axis D1 diodes by a line 88. The circuit 33 is connected to all the D2 diodes through a pull-down diode for each group of electrodes similar to the pull-down diode 47. A line 89 connects the circuit 33 to the other X axis pull-down diodes. The circuit 58 is connected to all of the Y axis D1 diodes by a line 91. The circuits 56 and 81 are connected to all of the D2 diodes through diode switches such as the matrix 64. The circuit 54 is connected through a line 92 to all of the D2 diodes through a pull-up diode for each group of electrodes similar to the pull-up diode 55.

The pulsers 73 and 77 must supply high currents to the R1 resistors of the non-selected electrodes in each array. Therefore, the multiplexed system of FIG. 2 cannot easily be formed in integrated circuits. The twin diode (D1 and D2) isolation, however, retains advantages even when the multiplexed system is abandoned and individual integrated circuit pulsers are connected to each electrode. Since the R1 resistor no longer performs the logic function of dropping the address pulse voltage on non-selected lines, it can be replaced in accordance with the present invention by a field effect transistor with the result that the rise time of the addressing pulse will be reduced. Furthermore, since the transistor switches in the matrices no longer are required for multiplexing, they can be replaced by a single switch on each axis.

Figure 5:
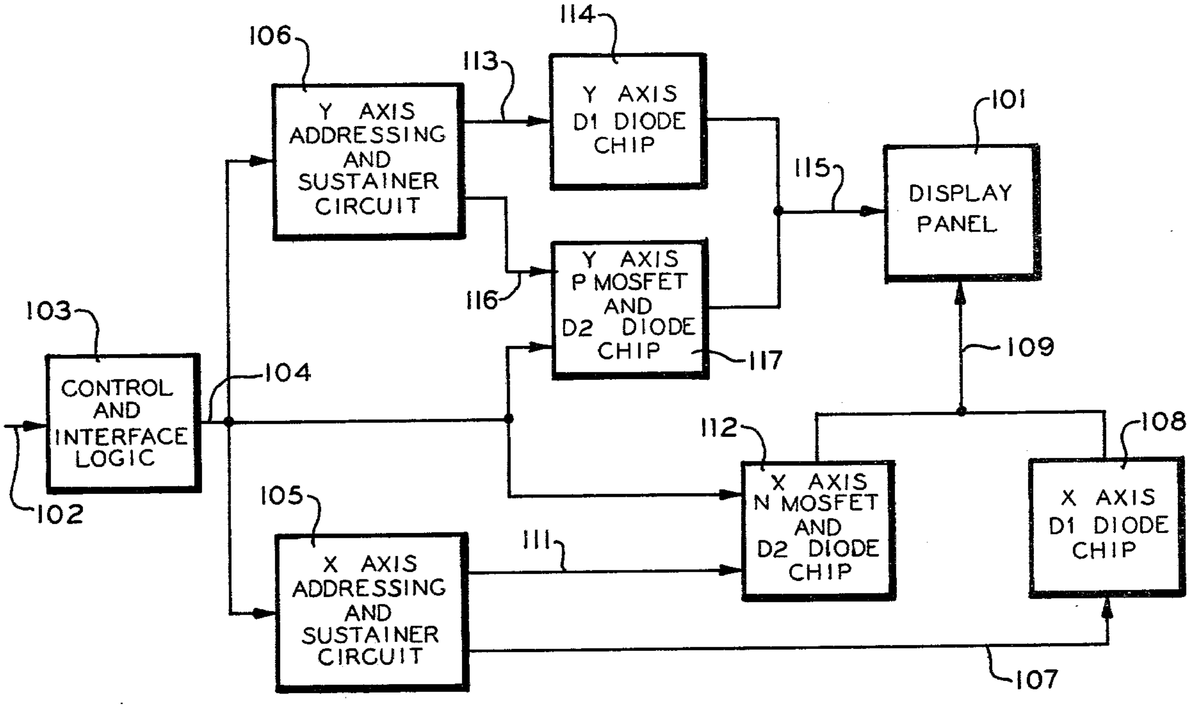
FIG. 5 is a block diagram of an operating system according to the present invention for a multicelled gas discharge display/memory device.

There is shown in FIG. 5 a block diagram of a gas discharge device operating system according to the present invention. A display panel 101 includes a pair of opposed electrode arrays (not shown) with proximate portions of at least one electrode in each array defining the cells. The information to be displayed on the panel is externally generated and applied as input signals on one or more lines 102 to a control and interface logic circuit 103. The circuit 103 buffers and decodes the input signals to generate control signals on lines 104 to a pair of addressing and sustainer circuits, an X axis circuit 105 and a Y axis circuit 106.

The X axis circuit 105 continuously generates a sustainer wave form on a line 107 to an X axis D1 diode chip 108. The integrated circuit chip 108 includes a plurality of diodes, one for each X axis electrode, with each diode having an anode connected to an associated X axis electrode by one of a plurality of lines 109 and a cathode connected in common with all the other D1 diode cathodes to the line 107. The circuit 105 selectively generates a portion of the sustainer wave form and addressing pulses on a line 111 to an X axis N MOSFET and D2 diode chip 112. The integrated circuit chip 112 includes a plurality of diodes, one for each X axis line, each having a anode connected to a source and a cathode connected to a drain of an associated one of a plurality of N-channel, high voltage, insulated gate, metal oxide semiconductor field effect transistors (MOSFET). The cathode of the D2 diode and the drain of the MOSFET are connected to an associated X axis electrode by one of the lines 109. The anode of the D2 diode and the source of the MOSFET are connected to all the other anodes and sources and to the line 111. A gate of each MOSFET is connected to one of the plurality of lines 104 to receive control signals from the circuit 103.

The Y axis addressing and sustainer circuit 106 continuously generates a sustainer wave form on a line 113 to a Y axis D1 diode chip 114. The integrated circuit chip 114 includes a plurality of D1 diodes with anodes connected in common to the line 113 and cathodes connected to associated Y axis electrodes by a plurality of lines 115. The circuit 106 selectively generates a portion of the sustainer wave form and addressing pulses on a line 116 to a Y axis P MOSFET and D2 diode chip 117. The integrated circuit chip 117 includes a plurality of D2 diodes each having an anode connected to a drain and a cathode connected to a source of an associated P MOSFET. The D2 diode anode and the MOSFET drain are connected to an associated Y axis electrode by one of a plurality of the lines 115 and the D2 diode cathode and the MOSFET source are connected in common with all other cathodes and sources to the line 116. A gate of each MOSFET is connected to one of the plurality of lines 104 to receive control signals from the circuit 103.

Figure 6:
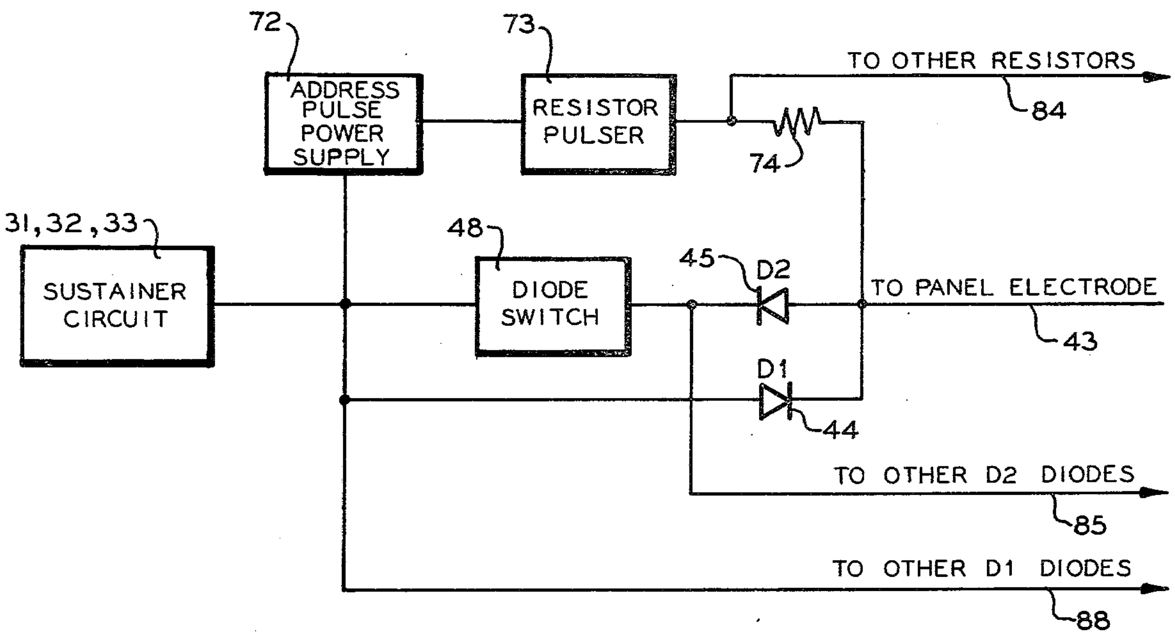
FIG. 6 (PRIOR ART)
FIG. 6 is a simplified block diagram of the prior art sustainer and addressing circuitry of FIG. 2.
Figure 7:
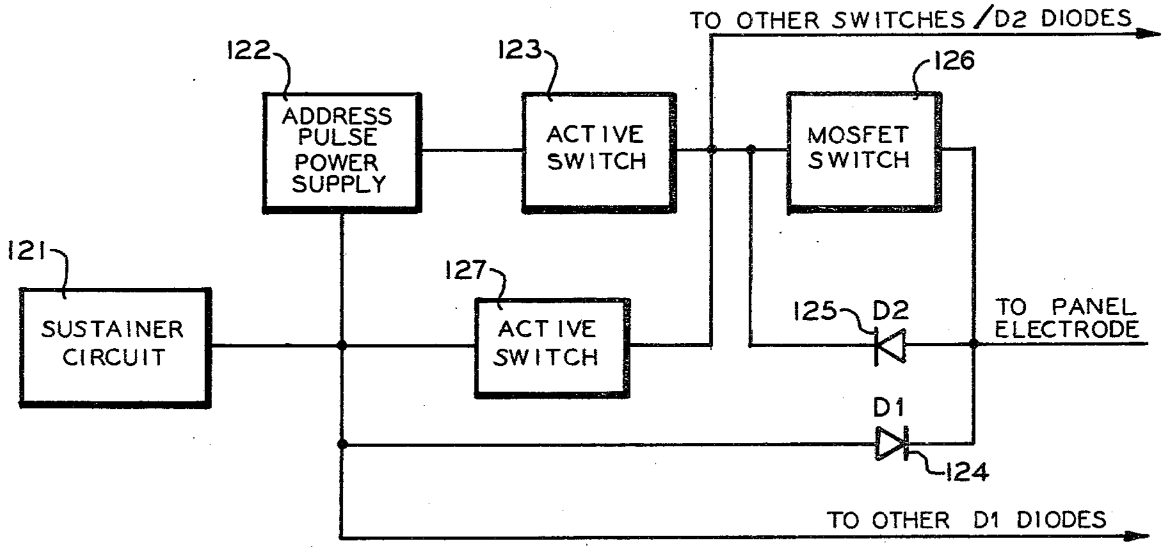
FIG. 7 is a simplified block diagram of the sustainer and addressing circuitry according to the present invention.

The system of FIG. 5 differs from the prior art system shown in FIGS. 1 and 2 in that the prior art addressing resistors have been replaced by high voltage MOSFETs. There is shown in FIG. 6 a simplified block diagram of the prior art sustainer and addressing circuitry of FIG. 2. Each electrode requires a separate addressing resistor 74 and a separate diode switch in the diode switch matrix 48. There is shown in FIG. 7 a simplified block diagram of the sustainer and addressing circuitry according to the present invention. A sustainer circuit 121, an address pulse power supply 122, an active switch 123, a D1 diode 124 and a D2 diode 125 are similar to the comparable elements in FIG. 6. However, the addressing resistor 74 for each electrode has been replaced by a MOSFET switch 126 which is selectively turned on to apply the addressing voltage as a pulse to the associated electrode. Since the MOSFET switches can be individually controlled, the diode switch matrix 48 of FIG. 6 can be replaced by a single active switch 127. Thus, the present invention substantially reduces the number of sustainer and addressing circuit elements and the integrated circuit chip design has advantages which will be discussed below.

Figure 9:
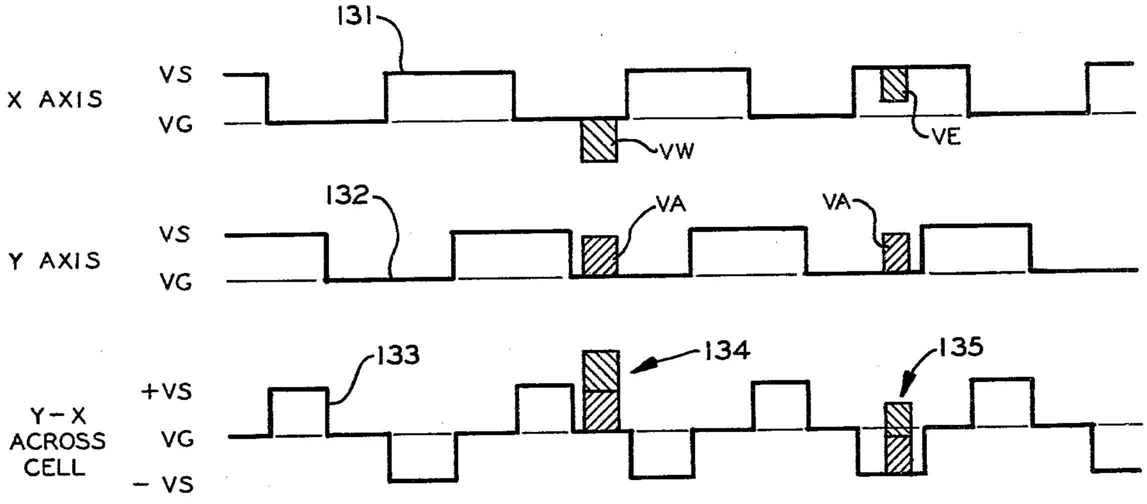
FIG. 9 is a wave form diagram of the sustainer wave form with "write" and "erase" pulses generated by the circuit of FIG. 8.
Figure 8:
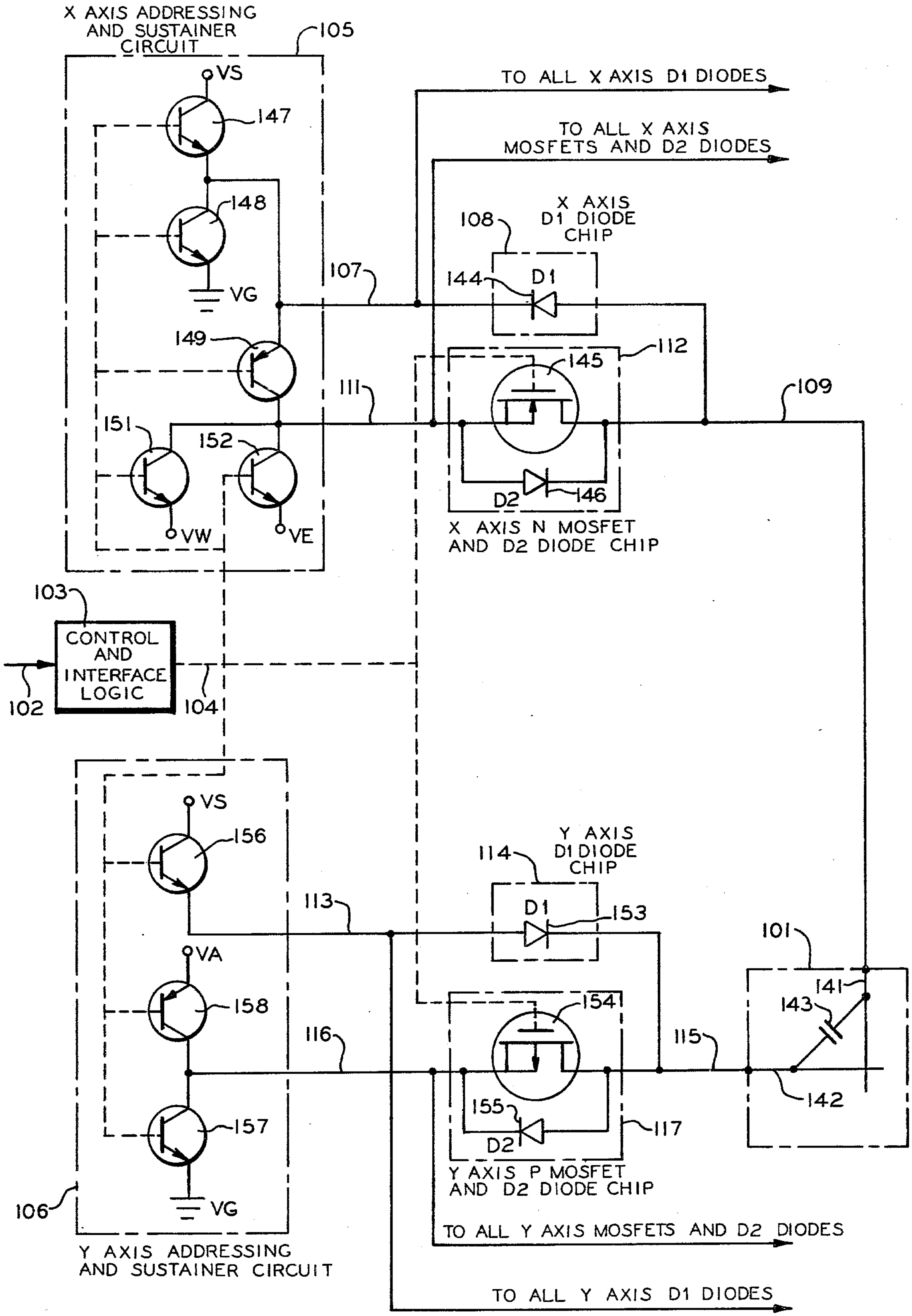
FIG. 8 is a schematic diagram of the sustainer and addressing circuit of FIGS. 5 and 7.

There is shown in FIG. 8 a schematic diagram of the sustainer and addressing circuitry of FIGS. 5 and 7. There is shown in FIG. 9 the sustainer wave form with "write" and "erase" pulses as generated by the circuit of FIG. 8. Comparing the wave forms of FIGS. 3 and 9, it can be seen that the pedestal voltage VP of FIG. 3 has been eliminated and the addressing voltages are referenced from the VG potential. This is achieved through the utilization of the high voltage MOSFETs which can switch higher voltage addressing pulses than the prior art resistor pulsers. Thus, the present invention reduces the complexity of the sustainer circuit. The X and Y addressing and sustainer circuits 105 and 106 generate wave forms 131 and 132 respectively which wave forms alternate between a maximum potential VS and a minimum potential VG and are 180° out of phase. The composite wave form 133 is applied to all the cells in the gas discharge device through the D1 and D2 diodes which also isolate the cells from one another. During a "write" operation, a partial select address pulse VW is generated on the selected X axis electrode with a polarity in opposition to the sustainer wave form and a partial select address pulse VA is generated on the selected Y axis electrode with a polarity the same as the sustainer wave form. The VW and VA address pulses are generated during a VG portion of the wave form 133 and add to generate a "write" pulse 134 to turn on the cell defined by the selected electrodes. During an "erase"

operation, a partial select address pulse VE is generated on the X axis and a partial select address pulse VA is generated on the Y axis during a −VS portion of the wave form 133 and add together to generate an "erase" pulse 135 to turn off the cell defined by the selected electrodes.

In FIG. 8, a plurality of dashed lines 104 represent the control lines which connect the control and interface logic 103 to the X and Y axis addressing and sustainer circuits 105 and 106, the X axis N MOSFET and D2 diode chip 112 and the Y axis P MOSFET and D2 diode chip 117. The control and interface logic 103 receives on the lines 102 the information necessary to generate control signals to the various circuit elements for generating the sustainer wave forms 131, 132 and 133, the "write" pulse 134, and the "erase" pulse 135 of FIG. 9.

As shown in FIG. 8, an X axis electrode 141 and a Y axis electrode 142 intersect to define a cell 143 in the panel 101. The electrode 141 is connected to an anode of a D1 diode 144 by one of the lines 109. The diode 144 is one of the X axis D1 diodes formed on the chip 108 of FIG. 5. The diode 144 has a cathode connected to the X axis addressing and sustainer circuit 105 by the line 107. The line 109 is also connected to a drain of an N-channel MOSFET 145 of the X axis N MOSFET and D2 diode chip 112. The MOSFET 145 has a source connected to the line 111 from the X axis addressing and sustainer circuit 105 and a gate connected to the line 104 to receive control signals from the control and interface logic 103. The chip 112 also includes a D2 diode 146 having an anode connected to the source and a cathode connected to the drain of the MOSFET 145.

The X axis addressing and sustainer circuit 105 includes switching means for generating the X axis sustainer wave form 131 of FIG. 6. An NPN transistor 147 has a collector connected to a VS potential power supply (not shown), a base connected to receive control signals on the line 104 and an emitter connected to the line 107. An NPN transistor 148 has a collector connected to the line 107, a base connected to receive control signals on the line 104 and an emitter connected to a VG potential power supply (not shown). A PNP transistor 149 has a collector connected to the line 111, a base connected to receive control signals on the line 104 and an emitter connected to the line 107 and is always turned on during normal sustainer operations. When the transistor 148 is turned on, the VG potential is applied to the electrode 141 through the D1 diode 144. When the transistor 147 is turned on, the VS potential is applied to the electrode 141 through the transistor 149 and the D2 diode 146.

The circuit 105 also includes switching means for generating the "write" and "erase" addressing pulses. An NPN transistor 151 has a collector connected to the line 111, a base connected to receive control signals on the line 104 and an emitter connected to a VW potential write pulse power supply (not shown). An NPN transistor 152 has a collector connected to the line 111, a base connected to receive control signals on the line 104 and an emitter connected to a VE potential erase pulse power supply (not shown). When the transistor 151 is turned on, the transistor 149 is turned off and the MOSFET 145 is turned on to apply the VW potential to the electrode 141 through the MOSFET 145. When the transistor 152 is turned on, the transistor 149 is turned off to remove the VS potential from the electrode 141 and the MOSFET 145 is turned on to apply the VE potential to the electrode 141.

On the Y axis, the electrode 142 is connected to a cathode of a D1 diode 153 by one of the lines 115. The diode 153 is one of the Y axis D1 diodes formed on the chip 114 of FIG. 5. The diode 153 has an anode connected to the Y axis addressing and sustainer circuit 106 by the line 113. The line 115 is also connected to a drain of a P-channel MOSFET 154 of the Y axis P MOSFET and D2 diode chip 117. The MOSFET 154 has a source connected to the line 116 from the Y axis addressing and sustainer circuit 106 and a gate connected to the line 104 to receive control signals from the control and interface logic 103. The chip 117 also includes a D2 diode 155 having an anode connected to the drain and a cathode connected to the source of the MOSFET 154.

The Y axis addressing and sustainer circuit 106 includes switching means for generating the Y axis sustainer wave form 132 of FIG. 6. An NPN transistor 156 has a collector connected to the VS potential power supply (not shown), a base connected to receive control signals on the line 104 and an emitter connected to the line 113. An NPN transistor 157 has a collector connected to the line 116, a base connected to receive control signals on the line 104 and an emitter connected to the VG potential power supply (not shown). When the transistor 156 is turned on, the VS potential is applied to the electrode 142 through the D1 diode 153. When the transistor 157 is turned on, the VG potential is applied to the electrode 142 through the D2 diode 155. The circuit 106 also includes switching means for generating the VA addressing pulses. A PNP transistor 158 has an emitter connected to a VA potential power supply (not shown), a base connected to receive control signals on the line 104 and a collector connected to the line 116. When the transistor 158 is turned on, the MOSFET 154 is turned on to apply the VA potential to the electrode 142.

Referring to FIGS. 7 and 8, the active switch 123 of FIG. 7 represents the transistors 151, 152 and 158 of FIG. 8 which are turned on to apply the address pulse power supply potential to the selected electrode through a MOSFET switch. The active switch 127 of FIG. 7 represents the transistor 149 of FIG. 8 which is turned on during normal sustainer operation and is turned off during addressing.

In the operating system according to the present invention, high voltage MOSFETs are utilized to replace the resistors and resister pulses of the prior art. Furthermore, the D2 diodes can be incorporated in the MOSFET chip while the D1 diodes are incorporated in another chip. Thus, two integrated circuit chips can replace all the discrete resistors, isolation diodes and resistor pulsers of the prior art for the same number of panel electrodes and reduce the prior art diode switch matrix to one switch. In addition, the prior art floating power supplies, utilized because of maximum voltage limitations on the circuit elements, can be replaced with less complicated ground referenced power supplies.

If a five hundred twelve line panel (512 electrodes by 512 electrodes) is utilized as an example, an operating system according to FIG. 7 requires one resistor pulser and one diode switch for each sixteen electrodes for a total of one hundred twenty-eight active switches. At one resistor and two diodes per electrode, three thousand seventy-two discrete elements are required. Typically, the chips 108, 112, 114 and 117 each have thirty-two MOSFETs and/or diodes thereon. Therefore, only sixty-four chips are required for the five hundred twelve line panel as compared with the three thousand and seventy-two discrete elements of the prior art system. The utilization of the chips also reduces the number of active switches. Typically the electrodes on each axis are divided evenly on either side of the panel. Separate switches 149, 151 and 152 are provided on both sides of the X axis and separate switches 158 are provided on both sides of the Y axis for a total of eight active switches as compared with one hundred twenty eight diode switches in the prior art circuit. Thus, it can be seen that the present invention achieves a substantial reduction in the amount of circuit elements and interconnections in an operating circuit for a gas discharge display/memory device.

Figure 10:
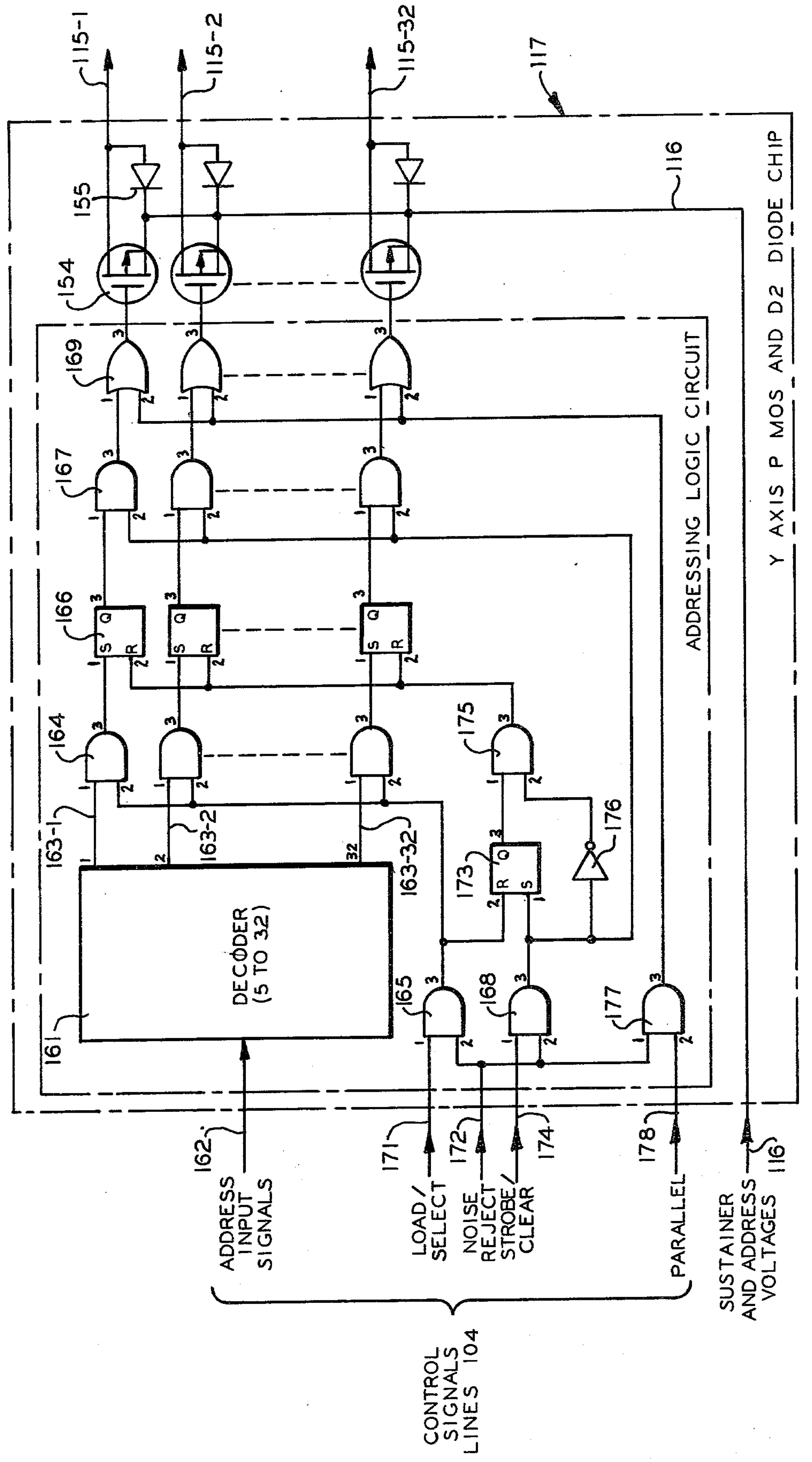
FIG. 10 is a more detailed schematic diagram of the Y axis P MOSFET and D2 diode chip of FIG. 5.

In addition to the MOSFETs and the D2 diodes, the integrated circuit chips 112 and 117 can also have formed thereon a portion of the logic circuitry utilized to address the electrode arrays thereby reducing the interconnections between the control and interface logic 103 and the chips 112 and 117. Such a configuration is especially important in reducing the number of interconnections with the display panel 101 where the chips 112 and 117 are mounted along the edges of the display panel. There is shown in FIG. 10 a more detailed schematic diagram of the chip 117 of FIG. 5. A decoder circuit 161 receives address signals on a plurality of input lines 162 which can be a portion of the control signal lines 104 of FIG. 5. Typically, the decoder 161 has five input lines for receiving a binary coded address representing an electrode to be addressed. The address signals are decoded to generate a select signal on the selected one of thirty-two output lines 163, each output line representing one electrode to be addressed.

Each decoder output line is an input to an individual AND gate. For example, the output line 163-1 is connected to an input 164-1 of an AND 164 which has another input 164-2 connected to an output 165-3 of an AND 165. If the address for the output line 161-1 is generated on the input lines 162, the decoder 161 will generate a logic "1" on the output line 163-1. If the AND 165 also generates a "1" at the output 165-3, the AND 164 will generate a "1" at an output 164-3 to a set input 166-1 of a reset/set (RS) flip flop 166. The "1" signal at the input 166-1 will generate a "1" signal at a noninverting output 166-3 to input 167-1 of an AND 167. The AND 167 has an input 167-2 connected to an output 168-3 of an AND 168. If the AND 168 generates a "1" to enable the AND 167, the AND 167 will generate a "1" at an output 167-3 to an input 169-1 of an OR 169. The "1" at the input 169-1 will be generated at an output 169-3 to the gate of the P channel MOSFET 154 shown in FIG. 8. The "1" at the gate turns on the MOSFET 154 which then passes the VA voltage on the line 116 to the line 115-1 of the plurality of lines 115 which connect the chip 117 to the axis electrodes.

The AND 165 has an input 165-1 connected to a LOAD/SELECT line 171 and an input 165-2 connected to a NOISE REJECT line 172, the lines 171 and 172 being two of the plurality of control signal lines 104. The output 165-3 of the AND 165 is connected to the −2 input of each AND for the decoder output lines and to a reset input 173-2 of an RS flip flop 173. The NOISE REJECT line 172 is also connected to an input 174-2 of the AND 168 which has an input 168-1 connected to a STROBE/CLEAR line 174. The output 168-3 of the AND 168 is connected to a set input 173-1 of the RS flip flop which has a noninverting output connected to an input 175-1 of an AND 175. The output 168-3 of the AND 168 is also connected to an input 175-2 of the AND 175 through an inverter 176. The AND 175 has an output 175-3 connected to a reset input of an RS flip flop for each of the ANDs connected to the decoder output lines such as a reset input 166-2 of the RS flip flop 166. The output 168-3 of the AND 168 is also connected to a −2 input of an AND for each of the noninverting outputs of the RS flip flops such as the input 167-2 of the AND 167. The NOISE REJECT line 172 is also connected to an input 177-1 of an AND 177 having an input 177-2 connected to a PARALLEL line 178. An output 177-3 of the AND 177 is connected to all −2 inputs of the ORs such as an input 169-2 of the OR 169.

The signal on the NOISE REJECT line 172 is normally "1" except during the time the sustainer circuit is switching voltage levels in the generation of the sustainer wave form. Since the sustainer switching can generate transient voltages which could generate false addressing signals, the NOISE REJECT line 172 is at "0" during this switching. When it is desired to load the RS flip flops with information concerning which electrodes are to be addressed, a "1" is generated on the LOAD/SELECT line 171 to generate a "1" from the AND 165 which enables the ANDs connected to the decoder output lines. The "1" from the AND 165 is also applied at the reset input 173-2 to generate a "0" at the output 173-3. The AND 175 responds to this "0" by generating a "0" at the reset inputs of all the Rs flip flops associated with the decoder 161 to enable these flip flops to be set with information. Address signals are generated on the input lines 162 and are decoded to set the selected RS flip flops at "1" through the AND connected to the decoder output lines. The signal on the LOAD/SELECT line 171 is then changed to "0" to disable the ANDs connected to the decoder output lines to prevent further changes in the address information as the selected electrodes are being addressed.

When it is desired to transfer the data stored in the RS flip flops, a "1" is generated on the STROBE/CLEAR line 174 and the AND 168 generates a "1" to enable the ANDs connected to the noninverting outputs of the RS flip flops. The flip flops which are set to "1" turn on their associated MOSFETs through the ANDs and ORs, such as the AND 167 and the OR 169, to address the associated electrode. The "1" generated by the AND 168 also sets the RS flip flop 173 to generate a "1" at the output 173-3. When the STROBE/CLEAR line 174 returns to "0", the AND 168 generates a "0" which is changed to a "1" by the inverter 176 at the input 175-2 of the AND 175. The AND 175 then generates a "1" to reset all of the RS flip flops to clear the electrode addressing data. The AND 177 is provided for simultaneously addressing all the electrodes. If a "1" is generated on the PARALLEL line 178, the AND 177 generates a "1" to all of the ORs which in turn generate a "1" to the gate of each associated MOSFET to address all of the electrodes at once.

In summary, the present invention concerns an improvement in an operating system for a multicelled gas discharge display/memory device. The device includes a pair of opposed, spaced apart electrode arrays with proximate electrode portions of at lease one electrode in each array defining the cells. The operating system includes a sustainer voltage source for imposing an alternating potential voltage having a period and a predetermined maximum potential across each of the cells, an address voltage source for generating write and erase address voltages to manipulate the discharge state of individual cells between an "on state" and an "off state", isolation diodes for applying the sustainer voltage to the electrodes and for isolating the electrodes from one another, switching circuits for selectively applying the address voltage to the electrodes and a source of control signals for controlling the operation of the sustainer voltage source, the address voltages source and the switching circuits. The improvement in the operating system comprises a first substrate having a first plurality of the isolation diodes formed thereon, each one of said first plurality having one terminal connected in common with all the others of said first plurality to the sustainer voltage source and another terminal connected to an associated electrode in one of the electrode arrays, and a second substrate having one of the switching circuits formed thereon including a plurality of solid state switches each having one side connected in common to the sustainer voltage source and the other side connected to an associated electrode in the one electrode array and being responsive to the control signals for selectively applying the address voltages to the associated electrode, the second substrate also having a second plurality of the isolation diodes formed thereon, each one of the second polarity being connected across an associated one of the solid state switches and poled oppositely from the first plurality of the isolation diodes. The second substrate can also have formed thereon means responsive to the control signals for generating a select signal for each electrode to be addressed in the one electrode array and means for storing the select signals and for generating the stored select signals to the plurality of solid state switches in response to the control signals wherein the solid state switches are responsive to the select signals for connecting the address voltages source to the associated electrodes.

The above-described operating system can be duplicated for the other electrode array such that for one axis the first substrate is included in at least one integrated circuit chip wherein the isolation diodes are in a common cathode configuration and the second substrate is included in at least a second integrated circuit chip wherein the solid state switches are N-channel MOSFETs. For the other axis, the first substrate is included in at least a third integrated circuit chip wherein the isolation diodes are in a common anode configuration and the second substrate is included in at least a fourth integrated circuit chip wherein the solid state switches are P-channel MOSFETs.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. In an operating system for a multicelled gas discharge display/memory device, the device including a pair of opposed, spaced apart electrode arrays with proximate electrode portions of at least one electrode in each array defining the cells and the operating system including a sustainer voltage source for imposing an alternating potential voltage having a period and a predetermined maximum potential across each of the cells, an address voltages source for generating write and erase address voltages to manipulate the discharge state of individual cells between an "on state" and an "off state", isolation diodes for applying the sustainer voltage to the electrodes and for isolating the electrodes from each other, switching circuits for selectively applying the address voltages to the electrodes and a source of control signals for controlling the operation of the sustainer voltage source, the address voltages source and the switching circuits, the improvement comprising:

a first substrate having a first plurality of the isolation diodes formed thereon, each one of said first plurality having one terminal connected in common with all others of said first plurality to the sustainer voltage source and another terminal connected to an associated electrode in one of the electrode arrays; and a second substrate having one of the switching circuits formed thereon including a plurality of solid state switches each having one side connected in common to the sustainer voltage source and the other side connected to an associated electrode in said one electrode array and being responsive to the control signals for selectively applying the address voltages to the associated electrode, said second substrate also having a second plurality of the isolation diodes formed thereon, each one of said second plurality being connected across an associated one of said solid state switches and poled oppositely from said first plurality of the isolation diodes.

2. An operating system according to claim 1 wherein said solid state switches are metal oxide semiconductor field effect transistors.

3. An operating system according to claim 1 wherein said second substrate has formed thereon means responsive to the control signals for generating a select signal for each electrode to be addressed in said one electrode array and wherein said solid state switches are responsive to the associated select signal for connecting the address voltages source to the associated electrode.

4. An operating system according to claim 3 wherein said select signal generating means generates said select signals in serial form and wherein said second substrate has formed thereon means for storing said select signals, said storage means being responsive to said control signals for generating said stored select signals to said plurality of solid state switches after all of said select signals for said one electrode array have been stored.

5. In an operating system for a multicelled gas discharge display/memory device, the device including a pair of opposed, spaced apart electrode arrays with proximate electrode portions of at least one electrode in each array defining the cells and the operating system including a sustainer voltage source for imposing an alternating potential voltage having a period and a predetermined maximum potential across each of the cells, an address voltages source for generating write and erase address pulses to manipulate the discharge state of individual cells between an "on state" and an "off state", isolation diodes for applying the sustainer voltage to the electrodes and for isolating the electrodes from each other, and switching circuits for selectively applying the address pulses to the electrodes, the improvement comprising:

at least one integrated circuit chip having a plurality of said isolation diodes formed thereon in common cathode configuration, said common cathodes being connected to the sustainer voltage source and an anode of each of said isolation diodes connected to an associated electrode in one of the electrode arrays;

at least a second integrated circuit chip having a plurality of solid state switches formed thereon, said switches having one side connected in common to the sustainer source and to the address voltages source and the other side connected individually to an associated electrode in said one electrode array, said second integrated circuit chip also having a plurality of said isolation diodes formed thereon, each of said isolation diodes being connected across an associated one of said solid state switches and poled oppositely from the isolation diodes in said one integrated circuit chip;

at least a third integrated circuit chip having a plurality of the isolation diodes formed thereon in common anode configuration, said common anodes being connected to the sustainer voltage source and a cathode of each of the isolation diodes connected to an associated electrode of the other one of the electrode arrays; and at least a fourth integrated circuit chip having a plurality of solid state switches formed thereon, said switches having one side connected in common to the sustainer source and to the address voltages source and the other side connected individually to an associated electrode in said other electrode array, said fourth integrated circuit chip also having a plurality of the isolation diodes formed thereon, each of the isolation diodes being connected across an associated one of said solid state switches and poled oppositely from the isolation diodes in said third integrated circuit chip.

6. An operating system according to claim 5 wherein said solid state switches are metal oxide semiconductor field effect transistors.

7. An operating system according to claim 6 wherein said solid state switches formed on said second integrated circuit chip are N-channel devices and said solid state switches formed on said fourth integrated circuit chip are P-channel devices.

8. An operating system according to claim 5 including means for generating address signals and control signals representing selected ones of the electrodes to which the address voltage is to be applied and wherein each of said second and fourth integrated circuit chips includes means for decoding said address signals to generate a select signal for each of the electrodes connected to said chips, means responsive to one of said control signals for storing said select signals and means responsive to another one of said control signals for applying said select signals to the associated solid state switches whereby said solid state switches are responsive to said select signals for applying the address voltages to the electrodes.

* * * * *